(12) United States Patent
Young et al.

(10) Patent No.: US 11,343,570 B2
(45) Date of Patent: May 24, 2022

(54) SYSTEMS AND METHODS FOR PROVIDING A STORYLINE SELECTION INTERFACE

(71) Applicant: Rovi Guides, Inc., San Jose, CA (US)

(72) Inventors: Rowena Young, Menlo Park, CA (US); Sang Mo Kim, Pleasanton, CA (US); Edison Lin, Los Altos Hills, CA (US); Milan Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/957,848

(22) PCT Filed: Dec. 29, 2017

(86) PCT No.: PCT/US2017/069002
§ 371 (c)(1),
(2) Date: Jun. 25, 2020

(87) PCT Pub. No.: WO2019/132986
PCT Pub. Date: Jul. 4, 2019

(65) Prior Publication Data
US 2021/0058672 A1    Feb. 25, 2021

(51) Int. Cl.
*H04N 5/445* (2011.01)
*H04N 21/458* (2011.01)
*H04N 21/431* (2011.01)
*H04N 21/435* (2011.01)
*H04N 21/472* (2011.01)
*H04N 21/8541* (2011.01)

(52) U.S. Cl.
CPC ......... *H04N 21/458* (2013.01); *H04N 21/435* (2013.01); *H04N 21/4312* (2013.01); *H04N 21/472* (2013.01); *H04N 21/8541* (2013.01)

(58) Field of Classification Search
CPC ........... H04N 21/4532; H04N 21/4882; H04N 21/44222; H04N 21/42204
USPC ...................................... 725/39, 46, 86, 134
See application file for complete search history.

(56) References Cited

U.S. PATENT DOCUMENTS 6,239,794 B1   5/2001 Yuen
6,564,378 B1   5/2003 Satterfield
(Continued)

FOREIGN PATENT DOCUMENTS

WO    WO 2016061083    4/2016

OTHER PUBLICATIONS

PCT International Search Report for International Application No. PCT/US2017/069002, dated Aug. 21, 2018.

*Primary Examiner* — Jivka A Rabovianski
(74) *Attorney, Agent, or Firm* — Haley Guiliano, LLP

(57) ABSTRACT

Systems and methods are provided herein for providing a storyline based media content. At least two storylines may be identified, each storyline specifying an order of providing a plurality of episodes from a plurality of interrelated series. Identifiers of the plurality of episodes are displayed. Then identifiers of a first set of the plurality of episodes that are relevant to the first storyline are graphically modified to indicate relevance to the first storyline. Identifiers of a second set of the plurality of episodes that are relevant to the second storyline are also graphically modified to indicate relevance to the second storyline. A first and second storyline identifier are generating for display to enable storyline selection. The interrelated series are then provided to a user device in the order specified by the selected storyline.

16 Claims, 10 Drawing Sheets

(56) References Cited

U.S. PATENT DOCUMENTS

| | | |
|---|---|---|
| 7,165,098 B1 | 1/2007 | Boyer |
| 7,761,892 B2 | 7/2010 | Ellis |
| 8,046,801 B2 | 10/2011 | Ellis |
| 9,430,115 B1 | 8/2016 | Yun |
| 2002/0174430 A1 | 2/2002 | Ellis |
| 2005/0251827 A1 | 7/2005 | Ellis |
| 2010/0153885 A1 | 6/2010 | Yates |
| 2012/0322041 A1* | 12/2012 | Weisman ................ G09B 5/00 434/308 |
| 2017/0103783 A1 | 4/2017 | Paglia et al. |
| 2018/0349368 A1* | 12/2018 | Bellingham ......... H04N 21/858 |

* cited by examiner

900

902 —
| Generate for Display an Identifier for Each of the Episodes of Each of the Plurality of Interrelated Series |

904 —
| Generate for Display a Geometric Shape for Each of the Episodes of Each of the Plurality of Interrelated Series |

906 —
| Generate for Display Visual Connectors that Connect the Geometric Shapes Based on the Sequential Order of the Series |

FIG. 9

SYSTEMS AND METHODS FOR PROVIDING A STORYLINE SELECTION INTERFACE

CROSS-REFERENCE TO RELATED APPLICATIONS

This application is a national stage application under 35 U.S.C. § 371 of International Application PCT/US2017/069002, filed Dec. 29, 2017, which is hereby incorporated by reference herein in its entirety.

BACKGROUND

Modern media entrainment systems can often provide several series to the user that are interrelated. For example, a first series may be made available for the user's viewing. In addition to the first series, the entrainment system may be able to provide additional series related to the first series, such as sequel series, prequel series, crossover series. In addition, the entrainment system may be able to provide series that include one or more shared characters with the first series and/or share the same universe as the first series. Currently, modern media entrainment systems can only provide such interrelated series in sequential order, or in the order manually selected by the user. At best, a recommendation to watch an interrelated series when the first series concludes may be provided. However, such interrelated series may often have storylines that traverse more than one of the interrelated series. However, modern systems have no way to indicate an availability of such storylines, much less an ability to provide a way for a user to select and request a display of such a storyline. Consequently, modern media entrainment systems may lack any way to provide a storyline-based presentation of content contained across a plurality of interrelated series.

SUMMARY

To this end and others, systems and methods are provided that improve the media entertainment systems by, among other things, improving the way the interrelated series are provided to the user, thus improving the consumption experience for users by providing a storyline selection interface. In particular, the media guidance application may identify at least two storylines that traverse some episodes of several interrelated series. For example, a storyline of a minor character from the first series may continue in several episodes of a sequel and/or crossover series. In another example, a backstory for a certain plot event shown in the first series may be available in the prequel series. In some embodiments, the media guidance application may generate identifiers (e.g., rectangular blocks) for each episode of the plurality of the interrelated series. The media guidance application may then modify a first set of identifiers (relevant to the first storyline) in a first way. The media guidance application may also modify a second set of identifiers (relevant to the second storyline) in a second way. For example, episodes may be marked in different colors, or transformed into different shapes. In another example, a first arrow may be displayed that intersects the first set, and a second arrow may be drawn that intersects the second set. The user may then be able to select the first or the second storyline, and the episodes related to that storyline may then be provided in an order defined by that storyline. In this way, the media guidance application provides an improved functionality to the media system, by allowing the media system to present to the user media content in an order defined by the storyline, as opposed to the usual way of presenting episodes in a sequential order. The improvement allows the user to view the storyline without the need to manually skip between episodes via manual selection of episodes, rewinding, or fast-forwarding.

In some embodiments, a media guidance application may identify at least two storylines, each storyline specifying an order for providing a plurality of episodes from a plurality of interrelated series. For example, the interrelated series may include a first series, as well as at least one sequel, prequel, crossover, or a series set in the same universe (e.g., a fictional universe) as the first series.

In some embodiments, the media guidance application may generate for display identifiers of the plurality of episodes. For example, the media guidance application may generate a rectangle (or another shape) representing each episode. In some embodiments, the rectangles may then be arranged on a screen of the user equipment. In some embodiments, the episodes may be arranged according to the order defined by the series.

In some embodiments, the media guidance application may graphically modify identifiers of a first set of the plurality of episodes that are relevant to the first storyline to indicate relevance to the first storyline. For example, identifiers of episodes related to the first storyline may be highlighted in a first color (e.g., blue). In some embodiments, a first arrow may be drawn by the media guidance application, such that the arrow crosses only the plurality of identifiers of episodes that are relevant to the first storyline.

In some embodiments, the media guidance application may graphically modify identifiers of a second set of the plurality of episodes that are relevant to the second storyline to indicate relevance to the second storyline. For example, identifiers of episodes related to the second storyline may be highlighted in a second color (e.g., red). In some embodiments, a second arrow may be drawn by the media guidance application, such that the arrow crosses only the plurality of identifiers of episodes that are relevant to the second storyline.

In some embodiments, the media guidance application may generate for display a first storyline identifier. For example, the media guidance application may generate a selection input (e.g., a button or radio selection input) indicative of the first storyline. In some embodiments, the media guidance application may also generate for display a second storyline identifier. For example, the media guidance application may generate a second selection input (e.g., a button or radio selection input) indicative of the second storyline.

In some embodiments, the media guidance application, in response to the user selecting the first or the second storyline identifier, may provide the interrelated series to a user device in the order specified by the selected storyline. For example, the media guidance application may, in response to the user pressing a button indicative of the first storyline, play only the episodes (or portions of episodes) that are relevant to the first storyline in the order defined by the first storyline. In another example, the media guidance application may, in response to the user pressing a button indicative of the second storyline, play only the episodes (or portions of episodes) that are relevant to the second storyline in the order defined by the second storyline.

In some embodiments, a media guidance application may identify at least two storylines relating to a plurality of interrelated series. For example, the interrelated series may include a first series, as well as at least one sequel, prequel, crossover, or a series set in the same universe as the first series. Each series may comprise a plurality of sequential episodes. Each storyline may identify an order of providing the interrelated series that is different from the sequential order of the episodes in the plurality of series. In addition, each storyline may traverse at least a portion of an episode of a first series of the plurality of interrelated series and a portion of an episode of a second series of the plurality of interrelated series.

For example, interrelated series may include a first series that includes 10 episodes (referred as S1.EP1-S1.EP10), a second series which is a sequel to the first series and includes 5 episodes (referred to as S2.EP1-S2.EP5), and a third series prequel that includes 3 episodes (referred as S3.EP1-S3.EP3). In some embodiments, the first storyline may relate to a minor character who appears in episodes S1.EP4, and S1.EP5 of the first series. The storyline of the minor character may be continued in a sequel (e.g., at episode S2.EP1). In some embodiments, the second storyline may relate to an event that occurs in episode S1.EP6 of the first series. The backstory for that event may be presented in the prequel series at episodes S3.EP1-S3.EP3. Consequently, the first storyline may define a sequence of episodes (e.g., S1.EP4, S1.EP5, S2.EP1). The second storyline may similarly define a sequence of episodes (e.g., S1.EP6, S3.EP1, S3.EP2, S3.EP3). In some embodiments, the storyline may identify portions of episodes instead of entire episodes. For example, the first storyline may include the first 10 minutes of an episode, or any time-slice of any episode.

In some embodiments, the media guidance application may then generate for display a storyline selection interface. For example, the storyline interface may be generated in response to a user command (e.g., a user selecting "storyline selection" option). In another example, the storyline interface may be generated in response to the series reaching a certain point, where the media guidance application may decide to offer the user an opportunity to watch the series in the storyline order, as opposed to the original order of the series. The storyline selection interface may be generated as describe below.

In some embodiments, the media guidance application may generate for display an identifier for each of the episodes of each of the plurality of interrelated series. For example, the media guidance application may generate a rectangle (or another shape) representing each episode. In some embodiments, the rectangles may then be arranged on a screen of the user equipment. In some embodiments, the episodes may be arranged according to the order defined by the series.

In some embodiments, the media guidance application may identify a first set of the episodes of the plurality of interrelated series that are traversed by a first storyline of the at least two storylines. For example, the media guidance application may check if metadata of each episode contains information that indicates that the first storyline traverses this episode. For example, an episode may include metadata that explicitly indicates "relevant to first storyline." In another embodiment, an episode may include metadata that matches metadata of the first storyline (e.g., the metadata of the first storyline and metadata of an episode may refer to the same character.) For example, the media guidance application may identify a first set of episodes as including episodes S1.EP4, S1.EP5, S2.EP1.

In some embodiments, the media guidance application may graphically modify identifiers of the first set of the plurality of episodes to indicate relevance to the first storyline. For example, identifiers of episodes S1.EP4, S1.EP5, S2.EP1 may be highlighted in a first color. In another embodiment, an arrow may be drawn that intersects identifiers of episodes S1.EP4, S1.EP5, S2.EP1.

In some embodiments, the media guidance application may identify a second set of the episodes of the plurality of interrelated series that are traversed by a second storyline of the at least two storylines. For example, the media guidance application may check if metadata of each episode contains information that identifies that the second storyline traverses this episode. For example, the media guidance application may identify a second set of episodes that includes episodes S1.EP6, S3.EP1, S3.EP2, S3.EP3.

In some embodiments, the media guidance application may graphically modify identifiers of the second set of the plurality of episodes to indicate relevance to the second storyline. For example, identifiers of episodes S1.EP4, S1.EP5, S2.EP1 may be highlighted in a second color. In another embodiment, an arrow may be drawn that intersects identifiers of episodes S1.EP6, S3.EP1, S3.EP2, S3.EP3.

In some embodiments, the media guidance application may generate for display a first storyline identifier. For example, the media guidance application may generate a button or radio input for selecting the first storyline by the user. In some embodiments, the media guidance application may also generate for display a second storyline identifier. For example, the media guidance application may generate a button or radio input for selecting the second storyline by the user.

In some embodiments, in response to receiving a selection of the first storyline identifier from the user, the media guidance application may provide interrelated series to a user device in the order specified by the first storyline. For example, the media guidance application may provide episodes S1.EP4, S1.EP5, S2.EP1 to the user's equipment. For example, these episodes may be played on the user's TV or computer screen. In another example, the media guidance application may record these episodes (e.g., on user's DVR) for later presentation in the aforementioned order.

In some embodiments, in response to receiving a selection of the second storyline identifier from the user, the media guidance application may provide interrelated series to a user device in the order specified by the second storyline. For example, the media guidance application may provide episodes S1.EP6, S3.EP1, S3.EP2, S3.EP3 to the user's equipment. For example, these episodes may be played on the user's TV or computer screen. In another example, the media guidance application may record these episodes (e.g., on user's DVR) for later presentation in the aforementioned order.

In some embodiments, the plurality of interrelated series comprises a first series, and a second series that is at least one of a crossover, sequel, and prequel, with relation to the first series In some embodiments, the media guidance application may retrieve a first storyline metadata and retrieve a second storyline metadata. For example, the first storyline metadata may comprise at least one of character metadata, title metadata, or chronology metadata. Similarly, the second storyline metadata may comprise at least one of character metadata, title metadata, or chronology metadata.

In some embodiments, the media guidance application may, for each particular episode of the plurality of interrelated series, retrieve particular metadata associated with that particular episode. For example, the media guidance application may retrieve metadata of S1.E1 (or any other particular episode) from a remote database. In some embodiments, the media guidance application may, in response to determining that the particular metadata matches the first storyline metadata, include the particular episode in the first set of the episodes. For example, if metadata of S1.E1. matches metadata (e.g., character name) of the first storyline, the media guidance application may include S1.E1. in the first set. In some embodiments, the media guidance application may, in response to determining that the particular metadata matches the second storyline metadata, include the particular episode in the second set of the episodes. For example, if metadata of S1.E1. matches metadata (e.g., character name) of the second storyline, the media guidance application may include S1.E1. in the second set.

In some embodiments, the media guidance application may generate for display a geometric shape for each of the episodes of each of the plurality of interrelated series. For example, each episode may be represented by a rectangle. In some embodiments, the media guidance application may then generate for display visual connectors that connect the geometric shapes based on the sequential order of the series. For example, all episodes of the first series may be connected by arrows (e.g., S1.E1 may be connected by an arrow to S1.E2, which in turn may be connected to S1.E3, etc.)

In some embodiments, the media guidance application may modify the geometric shapes of identifiers of episodes from the first set to include a first color. For example, these identifiers may be highlighted in blue. In some embodiments, the media guidance application may modify the geometric shape of identifiers of episodes from the second set to include a second color, different from the first color. For example, these identifiers may be highlighted in red.

In some embodiments, the media guidance application may modify the geometric shape of identifiers of episodes from the first set to comprise a first size. For example, these identifiers may be changed from rectangles to octagons. In some embodiments, the media guidance application may modify the geometric shape of identifiers of episodes from the second set to comprise a second size different from the first size. For example, these identifiers may be changed from rectangles to elongated ovals.

In some embodiments, the media guidance application may generate a first elongated shape (e.g., an arrow) indicative of the first storyline, wherein the first elongated shape intersects geometric shapes of identifiers of episodes from the first set. For example, an arrow may be drawn to intersect identifiers of episodes from the first set. In some embodiments, the media guidance application may generate a second elongated shape (e.g., a second arrow) indicative of the second storyline, wherein the second elongated shape intersects geometric shapes of identifiers of episodes from the second set. For example, a second arrow may be drawn to intersect identifiers of episodes from the second set. The first and second arrows may be of different color or different thickness.

In some embodiments, for each particular geometric shape intersected by the first elongated shape, the media guidance application may modify the particular geometric shape based on which portion of an episode associated with the particular geometric shape is traversed by the first storyline. For example, if only the first half of an episode is relevant to the first storyline, an arrow may be drawn such that it crosses the first half of the geometric shape associated with that episode.

In some embodiments, for each particular geometric shape intersected by the second elongated shape, the media guidance application may modify the particular geometric shape based on which portion of an episode associated with the particular geometric shape is traversed by the second storyline. For example, if only the second third of an episode is relevant to the second storyline, an arrow may be drawn such that it crosses the second third of the geometric shape associated with that episode.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 depicts an illustrative flow diagram for a process of generating episode identifiers, in accordance with some embodiments of the disclosure.

DETAILED DESCRIPTION

Figure 1A:
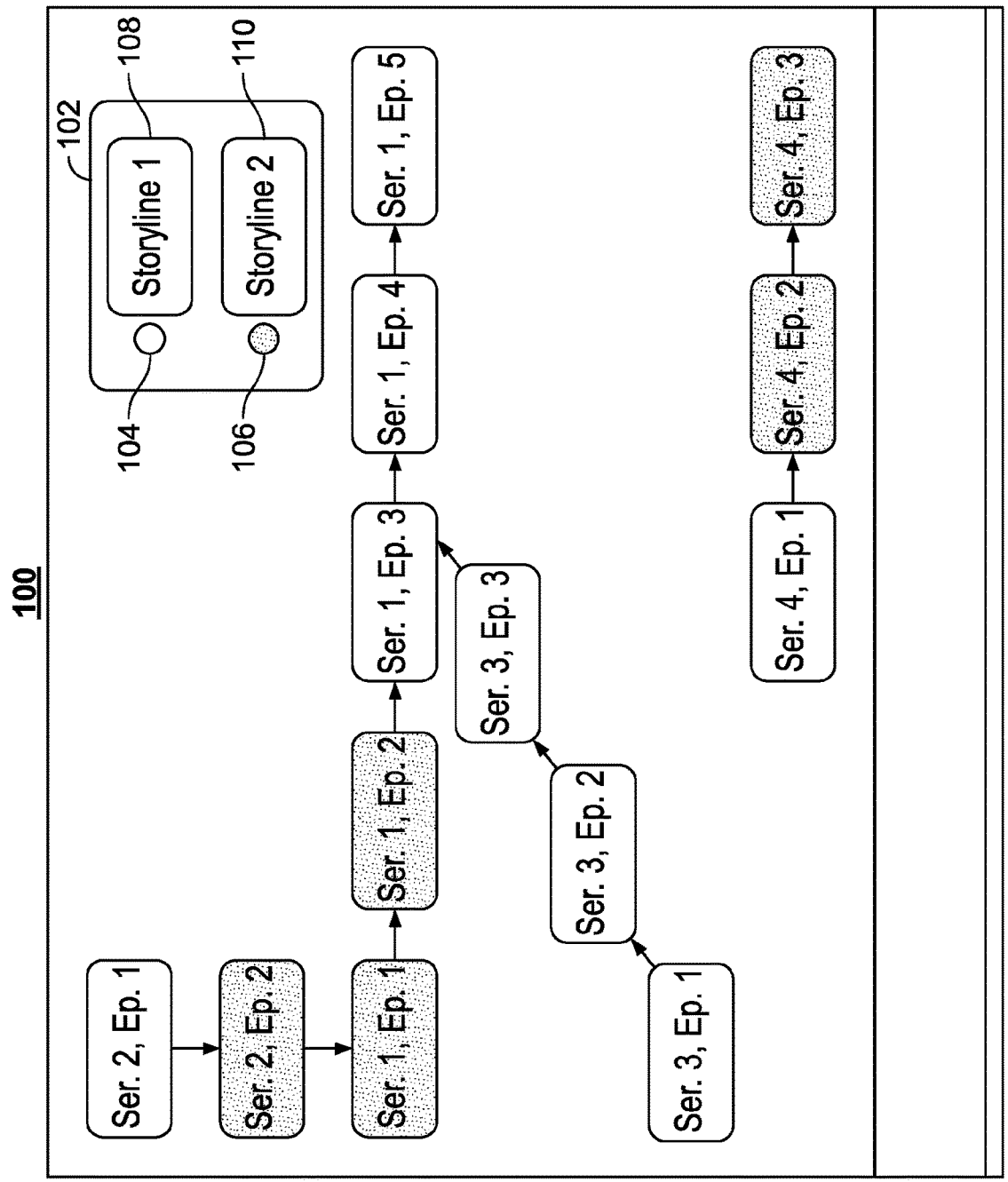
FIG. 1A shows an illustrative media guidance interface that may provide storyline selection interface, in accordance with some embodiments of the disclosure.

Systems and methods are disclosed herein for providing an improved storyline selection interface that allows a media system to provide a user with a storyline-based presentation of episodes (or episode fragments) of several interrelated series without the need for the user to manually skip around the episodes, fast-forward through episodes, or rewind through episodes, thus providing an improved and streamlined navigation interface and enhanced user experience.

For example, the media guidance application may identify at least two storylines among several interrelated series (e.g., series that include sequels, prequels or crossovers). Each storyline may specify an order of providing episodes (or portions of episodes) that is different from the normal, sequential order of episodes in the series. The media guidance application may display identifiers of the plurality of episodes, for example by displaying rectangles connected by the arrows, where each rectangle represents an episode and the arrows indicate the original order of the episodes. The media guidance application may then graphically modify identifiers of episodes relevant to the first storyline in a first way (e.g., by tinting the rectangle with a first color). The media guidance application may then graphically modify identifiers of episodes relevant to the second storyline in a second way (e.g., by tinting the rectangle with a second color). The colors may visually identify which episodes are relevant to each storyline. In some embodiments, the media guidance application may then allow the user to select one of the storylines, and present the episodes in the order specific to the selected storyline.

As referred to herein, the term "series" or "media asset series" refers to any kind of media (e.g., video, audio, or multimedia) content that includes distinct sequential episodes that may be watched separately from one another. For example, the television series Game of Thrones may include sequential episodes "Episode 1," "Episode 2," . . . "Episode 7." A series may be intended to be provided in a sequential order according to episode numbering via a television, a computer, or any other user device.

As referred to herein, the term "episode" refers to any kind of media (e.g., video, audio, or multimedia) content that forms a distinct part of a series. Each episode can be watched separately from other episodes of the series. Episodes may be typically arranged sequentially by number such that content of one episodes follows content of a previous episode.

As referred to herein, the term "storyline" refers to any kind of data or data-structure that defines the order of presentation of episodes, or portions of episodes of a series or of a plurality of interrelated series. For example, a storyline related to a particular character may define an order of playback of episodes, or portions of episodes, that relate to that character. In another example, a storyline associated with a particular event may define an order of playback of episodes, or portions of episodes, that relate to events leading up to that particular event, the occurrence of that event, and aftermath of that event.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean electronically consumable user assets, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative media guidance interface on a display screen that may provide storyline selection interface, in accordance with various embodiments of the disclosure. Display 100 shows a media guidance interface for storyline-based navigation. In some embodiments, display 100 may display media content provided by the media guidance application. For example, display 100 may display an image. The image may be a part of media content provided by the media guidance application. In some embodiments, media content provided by the media guidance application includes a plurality of interrelated series that contains a plurality of sequential episodes.

In some embodiments, display 100 may include a plurality of identifiers of episodes relating to a plurality of interrelated series. In some embodiments, display 100 may include identifiers for episodes of four different interrelated series. For example, display 100 may include identifiers for Series 1 (Ser. 1), Series 2 (Ser. 2), Series 3 (Ser. 3), and Series 4 (Ser. 1). Series 1 may include episodes 1-5 (Ep. 1-EP. 5), Series 2 may include episodes 1-2 (Ep. 1-EP. 2), Series 3 may include episodes 1-3 (Ep. 1-EP. 3), and Series 4 may include episodes 1-3 (Ep. 1-EP. 3).

In some embodiments, series 1 may be the original series (e.g., first series) that was originally aired. Series 2 may be a prequel series to the first series. Series 3 may be a crossover series related to the first series. Series 4 may be a series that takes place in the same in-show universe as the first series, and may depict events that occur at the same time as the events of the first series occur. In some embodiments, display 100 may also display identifiers for other series, such as sequels, additional crossover, additional prequels, etc.

In some embodiments, the episode identifiers may comprise a certain shape (e.g., rectangle or any other geometric shape). In some embodiments, the episode identifiers may be connected with arrows demonstrating the original intended order for each series. For example, with respect to the first series, identifier Ser. 1, Ep. 1 may be connected to Ser. 1, Ep. 2, which is in turn connected to Ser. 1, Ep. 3, etc. In some embodiments, additional arrows may indicate relationship of series with each other. For example, the identifier of Ser. 2, Ep. 2 may be connected to Ser. 1, Ep. 1 to indicate that the second series is a prequel to the first series. In some embodiments, the placement of the episode identifiers may be indicative of their relative chronological order. For example, identifiers for Ser. 1, Ep. 3-Ser. 1, Ep. 5 and Ser. 4, Ep. 1-Ser. 4, Ep. 3 may have the same horizontal location to indicate that those episodes depict events that occur roughly at the same time.

In some embodiments, display 100 may include storyline selection interface 102. In some embodiments, storyline selection interface 102 may include first storyline identifier 108 and second storyline identifier 110. For examples, first storyline identifier 108 may be a button (or another selection interface element) labeled "Storyline 1" (or labeled with a text that describes the first storyline). In another example, second storyline identifier 110 may be a button (or another selection interface element) labeled "Storyline 2" (or labeled with text that describes the second storyline). In some embodiments, storyline section interface 102 may include first graphical label 104 for first storyline identifier 108, and second graphical label 106 for second storyline identifier 110. For example, first graphical label 104 and second graphical label 106 may include geometric shapes (e.g., circles) that identify a color associated with the receptive storyline. For example, first graphical label 104 may be a blue circle, and second graphical label 106 may be a red circle (the second color is represented as a dot pattern in FIG. 1A).

In some embodiments, the media guidance application may graphically modify the episodes identifiers based on which episodes are relevant to the first and second storylines. For example, the media guidance application may determine that Ser. 2, Ep. 2, Ser. 1, Ep. 1; Ser. 1, Ep. 2; Ser. 4, Ep. 2; and Ser. 4, Ep. 3 (a second set of episodes) are relevant to the second storyline. In some embodiments, the media guidance application may then modify each identifier of episodes belonging to the second set of episodes to be indicative of the second storyline. For example, the media guidance application may modify each identifier of episodes belonging to the second set of episodes to include the second color (e.g., red). For example, the backgrounds of the identifier may be changed to the second color. In some embodiments, the identifiers may only be modified to include some element in the second color. In some embodiments, identifiers may be modified to include a second color border or outline.

In some embodiments, similarly, a first set of episodes may be identified that are relevant to the first storyline. In some embodiments, the media guidance application may then modify each identifier of episodes belonging to the first set of episodes to be indicative of the first storyline. For example, the media guidance application may modify each identifier of episodes belonging to the second set of episodes to include the first color (e.g., blue).

In some embodiments, the first set of episodes and the second set of episodes are modified one at a time, e.g., in response to user input. In some embodiments, the first set of episodes and the second set of episodes are modified simultaneously. In this embodiment, a particular episode may belong to both the first set and the second set. In some embodiments, the identifier of such a particular episode may be modified to be indicative of the first storyline and the second storyline. For example, the identifier of such a particular episode may include both a first and a second color.

In some embodiments, the user may select a storyline by interacting with first storyline identifier 108 and second storyline identifier 110 (e.g., by pressing the corresponding button). In some embodiments, if the user interacts with second storyline identifier 110, the media guidance application may provide for display the second set of episodes in the order specified by the second storyline. For example, the media guidance application may play the following episodes in order: Ser. 2, Ep. 2; Ser. 1, Ep. 1; Ser. 1, Ep. 2, Ser. 4; Ep. 2, and Ser. 4, Ep. 3. In some embodiments, the media guidance application may schedule the aforementioned episodes for recording on the user equipment for later presentation in the order specified by the second storyline. Similar action may be performed with respect to the first set of episodes in response to the user interacting with the first storyline identifier.

In some embodiments, display 100 may include any number of storyline identifiers, and the episode identifiers may be modified in any number of ways to be indicative of any number of storylines.

In some embodiments, the media guidance application may provide additional features. For example, the media guidance application may provide a way to toggle between "full" storyline and "key" storyline. If the "key" storyline option is chosen, some episodes (not considered key) may be not modified to be indicative of that storyline. In some embodiments, identifiers of episodes that are not considered "key" may be modified to include a tag (e.g., text "summary only"). When the media guidance application plays such non-key episodes in response to a storyline section, only a summary version may be provided instead of the full episode.

In some embodiments, the media guidance application may provide an option to rearrange the order of identifiers of episodes based on the user input. For example, if the user requests a focused view of the second storyline, the media guidance application may remove all identifiers other than those relevant to the second storyline. The remaining identifiers may be rearranged (e.g., to be displayed in a single line) to indicate the order specified by the second storyline.

In some embodiments, the media guidance application may detect interrelated series (e.g., Ser 1, Ser. 2, Ser. 3, and Ser. 4), based on markers includes into each episodes of the interrelated series that identify other interrelated series which may be relevant to the current series or to the current episode. In some embodiments, the media guidance application may present a notification to the user about the viability of interrelated series (e.g., of series that feature a continuation to the storyline of the currently watched series). In some embodiments, display 100 may be displayed in response to the user interaction with the notification. In some embodiments, the media guidance application may only present the notification in response to determining that the user has been watching or have scheduled for recording episodes of only one of the interrelated series and did not scheduled for recording any episodes of the other interrelated series.

In some embodiments, such a notification may allow the user to schedule for recording all the episodes of the interrelated series. In some embodiments, if some of the episodes of the interrelated series not available for recording, the media guidance application may search for on-demand episodes of the sister series and download those on-demand interrelated episodes for the user.

In some embodiments, the media guidance application may detect that the interrelated series includes a number of episodes that continue the storyline that is currently being watched by the user. For example, if the user is watching episodes relating to a particular character, or to a particular event. In some embodiments, the media guidance application may then automatically offer to the user an option to continue watching this storyline (which may be spread out among other episodes of the interrelated series) instead of continuing to watch the current series in the original order. For example, the media guidance application may present display 100 where the second storyline is indicative of continuing the storyline that is currently being watched by the user. In some embodiments, the media guidance application may only schedule for recording those episodes of the interrelated series that continue the current storyline. In some embodiments, the media guidance application may automatically download only those episodes that continue the storyline if they are available on demand.

In some embodiments, the media guidance application may present to a user a notification about the availability of an interrelated series featuring a continuation to the current storyline before the user starts watching a given series. For example, if the user selected a given series (e.g., the "Flash" TV series, or Ser. 1) for viewing, the media guidance application may determine that the user did not record or view episodes of the "Supergirl" TV series (e.g., Ser. 2) which includes content that starts the storyline featured in the "Flash" TV series. In some embodiments, the media guidance application may notify the user that he should watch the "Supergirl" TV series first before the "Flash" TV series. In some embodiments, the media guidance application may automatically download a copy of the "Flash" TV series for the user to watch before the "Supergirl" TV series. After the user watches the "Flash" TV series, the media guidance application may present the related episodes of the "Supergirl" TV series that continue the storyline of the "Flash" TV series and episodes of any other interrelated series that continue the storyline from the "Supergirl" TV series.

In some embodiments, the media guidance application may identify a movie that continues the storyline that was being featured in the interrelated series. In some embodiments, when the user watches the interrelated series on demand (e.g., by binge watching the series), the media guidance application may include in the playlist the movie in the appropriate position in the sequence that continues the story. In some embodiments, after the movie is provided to the user, the media guidance application may continue presenting episodes of the interrelated series that continue the storyline (e.g., in accordance with the order identified by one of the storylines). In some embodiments, the media guidance application may suggest that the user watch the movie instead of the next requested episode.

Figure 1B:
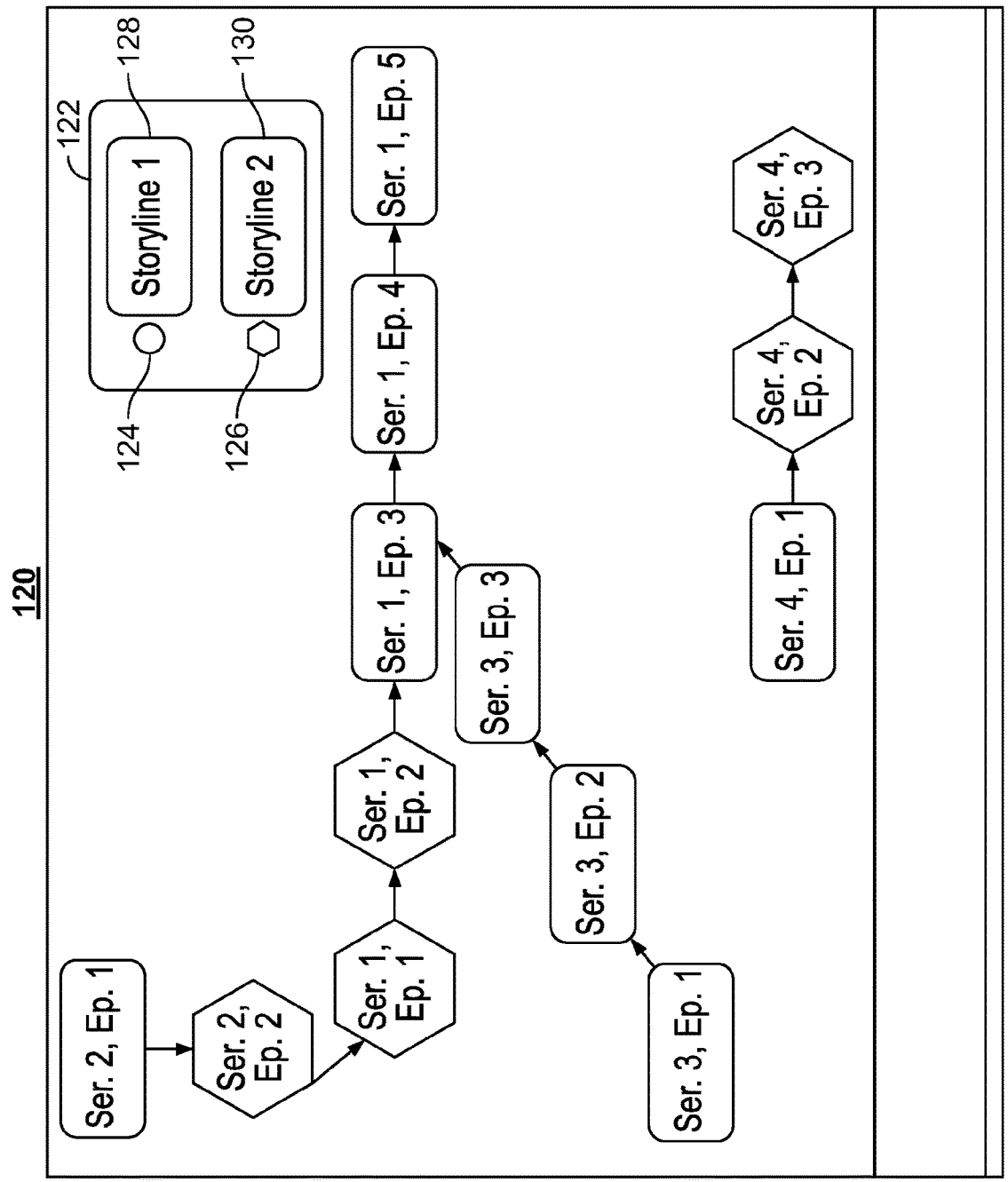
FIG. 1B shows another illustrative media guidance interface that may provide storyline selection interface, in accordance with some embodiments of the disclosure.

FIG. 1B shows another illustrative media guidance interface on a display screen that may provide a storyline selection interface, in accordance with various embodiments of the disclosure. Display 120 shows a media guidance interface for storyline-based navigation. In some embodiments, display 120 may display media content provided by the media guidance application. For example, display 120 may display an image. The image may be a part of media content provided by the media guidance application. In some embodiments, media content provided by the media guidance application includes a plurality of interrelated series that contains a plurality of sequential episodes.

In some embodiments, display 120 may include a plurality of identifiers of episodes relating to a plurality of interrelated series. In some embodiments, display 120 may include identifiers for episodes of four different interrelated series. For example, display 120 may include identifiers for Series 1, 2, 3, and 4. In some embodiments, Series 1, 2, 3, and 4 may be the same series demonstrated in FIG. 1A. In some embodiments, the display may lay out the identifiers for display as was described in relation to FIG. 1A.

In some embodiments, display 120 may include storyline section interface 122. In some embodiments, storyline section interface 122 may include first storyline identifier 128 and second storyline identifier 130. For examples, first storyline identifier 128 may be a button (or another selection interface element) labeled "Storyline 1" (or with text that describes the first storyline). In another example, second storyline identifier 130 may be a button (or another selection interface element) labeled "Storyline 2" (or with text that describes the second storyline). In some embodiments, storyline section interface 122 may include first graphical label 124 for first storyline identifier 108, and second graphical label 126 for second storyline identifier 130. For example, first graphical label 124 may include a first shape (e.g., a circle) indicative of the first storyline. In some embodiments, second graphical label 126 may include a second geometric shapes (e.g., a hexagon) that is indicative of the second storyline.

In some embodiments, the media guidance application may graphically modify the episodes identifiers based on which episodes are relevant to the first and second storylines. For example, the media guidance application may determine that Ser. 2, Ep. 2, Ser. 1, Ep. 1; Ser. 1, Ep. 2; Ser. 4, Ep. 2; and Ser. 4, Ep. 3 (a second set of episodes) are relevant to the second storyline. In some embodiments, the media guidance application may then modify each identifier of episodes belonging to the second set of episodes to be indicative of the second storyline. For example, the media guidance application may modify each identifier of episodes belonging to the second set of episodes to include a particular geometric shape (e.g., a hexagon).

In some embodiments, similarly, a first set of set of episodes may be, identified that are relevant to the first storyline. In some embodiments, the media guidance application may then modify each identifier of episodes belonging to the first set of episodes to be indicative of the first storyline. For example, the media guidance application may modify each identifier of episodes belonging to the second set of episodes to include a second geometrical shape (e.g., a circle).

In some embodiments, the user may select a storyline by interacting with first storyline identifier 128 and second storyline identifier 130 (e.g., by pressing the corresponding buttons). In some embodiments, if the user interacts with second storyline identifier 130, the media guidance application may provide for display the second set of episodes in the order specified by the second storyline. Similar action may be performed with respect to the first set episodes in response to the user interacting with the first storyline identifier.

Figure 1C:
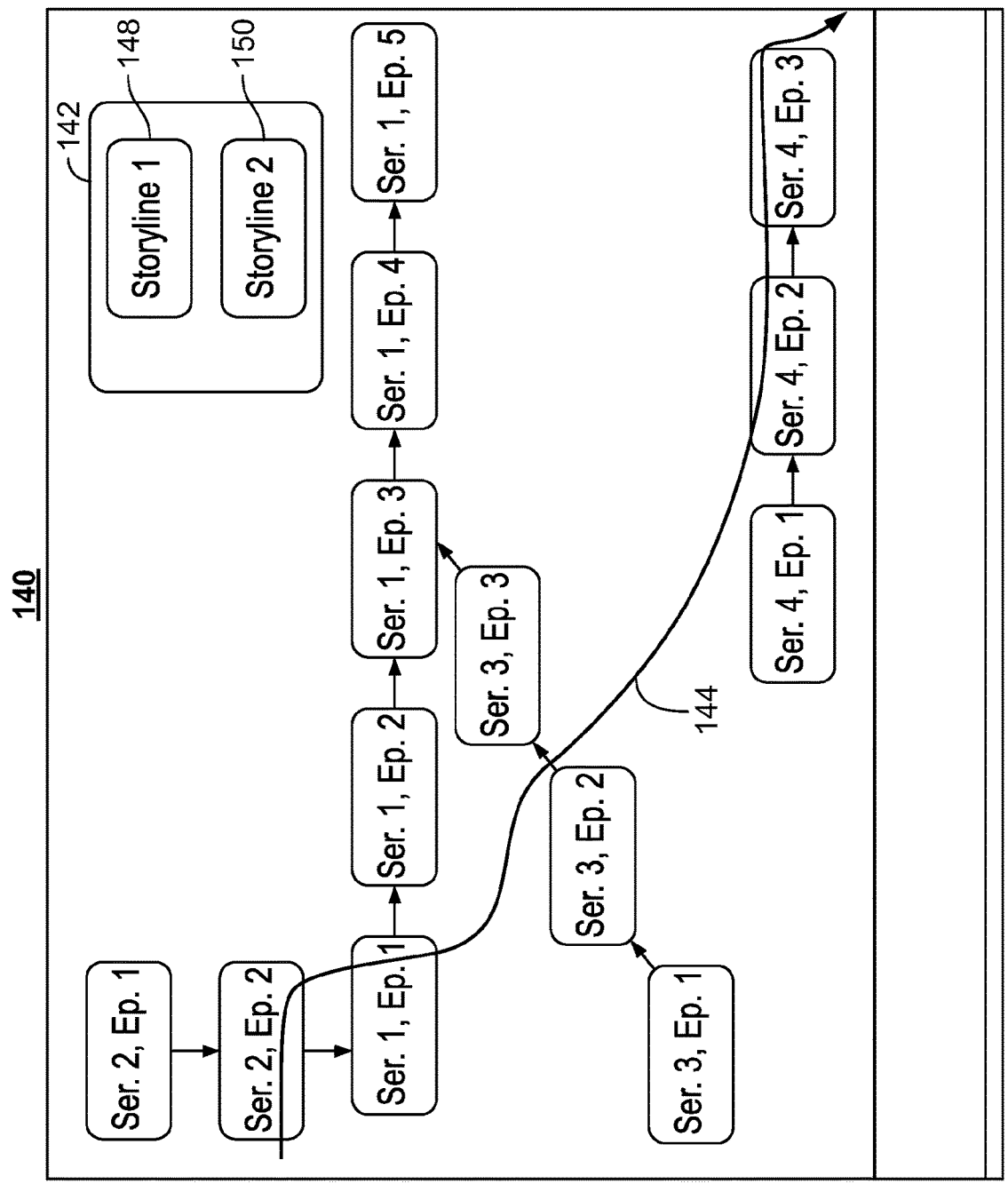
FIG. 1C shows yet another illustrative media guidance interface that may provide storyline selection interface, in accordance with some embodiments of the disclosure.

FIG. 1C shows another illustrative media guidance interface on a display screen that may provide storyline selection interface, in accordance with various embodiments of the disclosure. Display 140 shows a media guidance interface for storyline-based navigation. In some embodiments, display 140 may display media content provided by the media guidance application. For example, display 140 may display an image. The image may be a part of media content provided by the media guidance application. In some embodiments, media content provided by the media guidance application includes a plurality of interrelated series that contains a plurality of sequential episodes.

In some embodiments, display 140 may include a plurality of identifiers of episodes relating to a plurality of interrelated series. In some embodiments, display 140 may include identifiers for episodes of four different interrelated series. For example, display 140 may include identifiers for Series 1, 2, 3, and 4. In some embodiments, Series 1, 2, 3, and 4 may be the same series demonstrated in FIG. 1A. In some embodiments, display may lay out the identifiers for display as was described in relation to FIG. 1A.

In some embodiments, display 140 may include storyline selection interface 142. In some embodiments, storyline section interface 142 may include first storyline identifier 148 and second storyline identifier 150. For examples, first storyline identifier 148 may be a button (or another selection interface element) labeled "Storyline 1" (or with text that describes the first storyline). In another example, second storyline identifier 150 may be a button (or another selection interface element) labeled "Storyline 2" (or with text that describes the second storyline).

In some embodiments, the media guidance application may graphically modify the episodes identifiers based on which episodes are relevant to the first and second storylines. For example, the media guidance application may determine that Ser. 2, Ep. 2, Ser. 1, Ep. 1, Ser. 1, Ep. 2, Ser. 4, Ep. 2, and Ser. 4, Ep. 3 (a second set of episodes) are relevant to the second storyline. In some embodiments, the media guidance application may then modify each identifier of episodes belonging to the second set of episodes to be indicative of the second storyline. For example, the media guidance application may generate for display a second storyline arrow 144 that only intersects identifiers of episodes related to the second storyline.

In some embodiments, similarly, a first set of set of episodes may be, identified that are relevant to the first storyline. In some embodiments, the media guidance application may then modify each identifier of episodes belonging to the first set of episodes to be indicative of the first storyline. For example, the media guidance application may generate for display a first storyline arrow (not shown) that only intersects identifiers of episodes related to the first storyline.

In some embodiments, the way second storyline arrow 144 intersect with episodes of the second set of episodes may be indicative of which portion of the episode is relevant to the second storyline. For example, the second storyline may identify that entire Ser. 2, Ep. 2 is relevant to the second storyline, while only last 25% of Ser 1., Ep 1 is relevant to the second storyline. In this example, second storyline arrow 144 may intersect the identifier for Ser. 2, Ep. 2 in its entirety, and only intersect the rightmost 25% of the identifier for Ser. 1, Ep. 2.

In some embodiments, the user may select a storyline by interacting with first storyline identifier 148 and second storyline identifier 150 (e.g., by pressing the corresponding button). In some embodiments, if the user interacts with second storyline identifier 150, the media guidance application may provide for display the second set of episodes in the order specified by the second storyline. In some embodiment, only portions of the episodes that are relevant to the second storyline are provided. For example, the media guidance application may play Ser. 2, Ep. 2 its entirety, while only 25% of Ser 1., Ep 1 is played. Similar action may be performed with respect to the first set episodes in respond to the user interacting with first storyline identifier 148.

Figure 2:
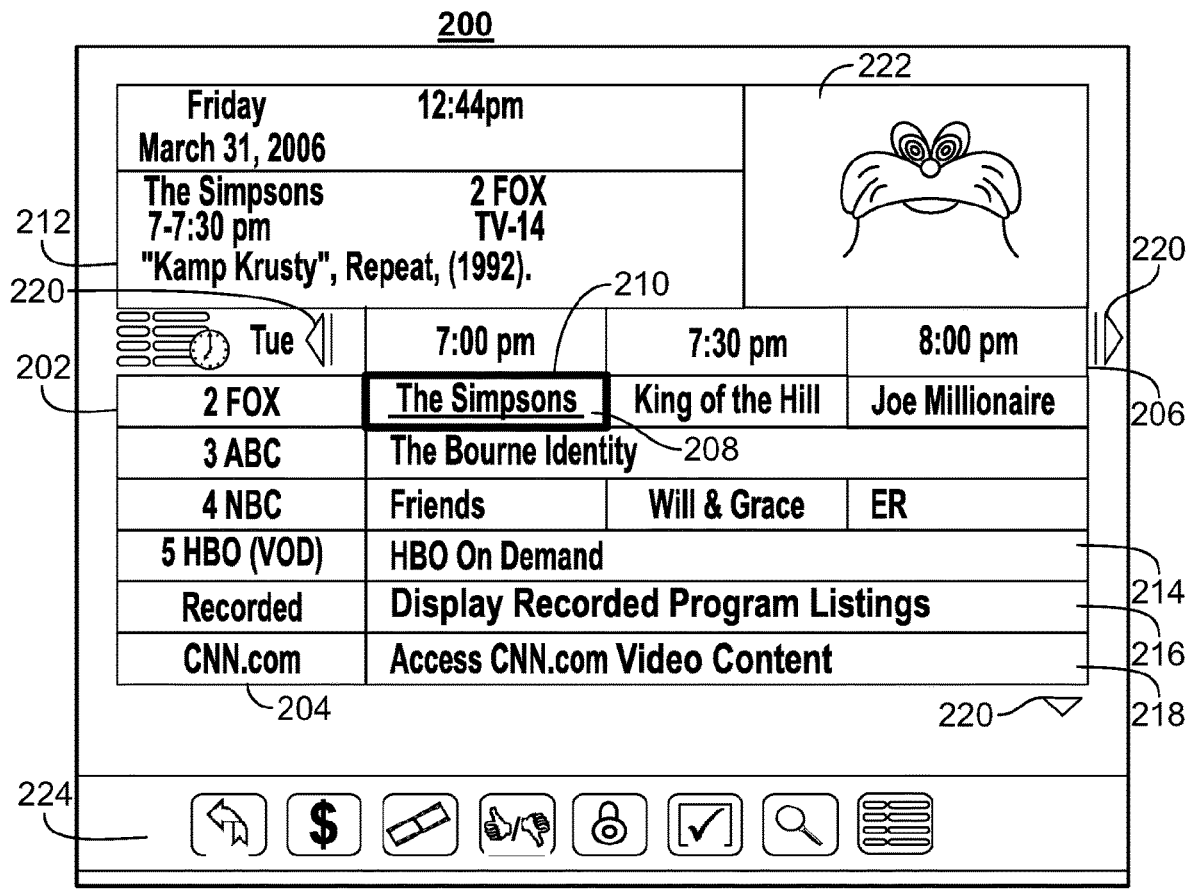
FIG. 2 shows another illustrative media guidance interface that may dynamically include or exclude a video, in accordance with some embodiments of the disclosure.
Figure 3:
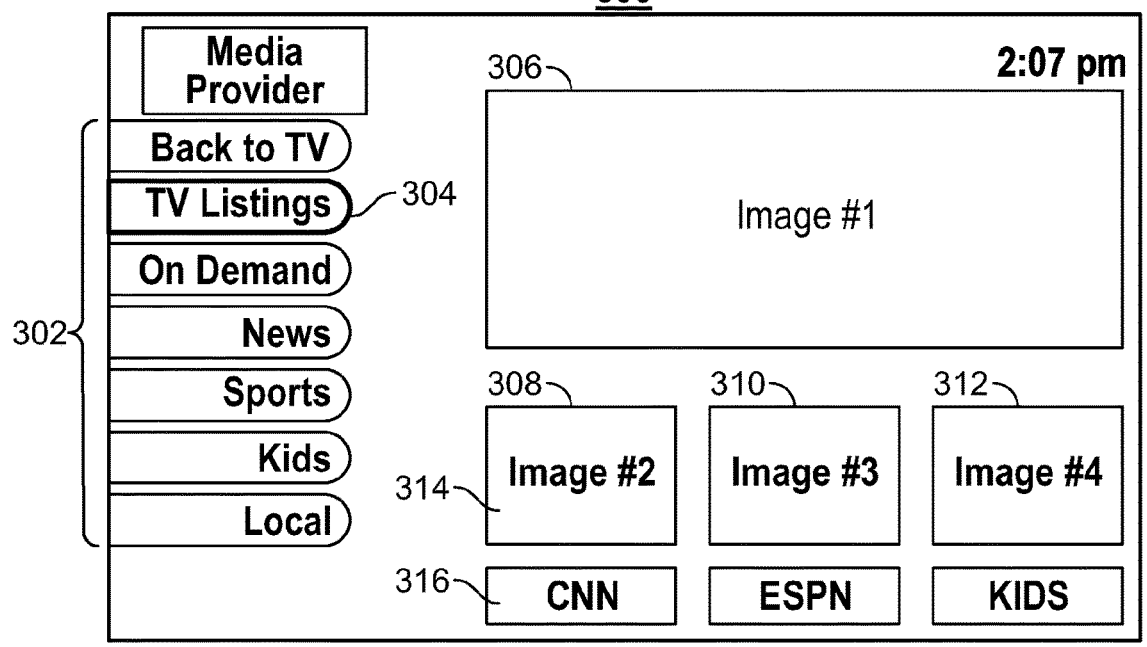
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
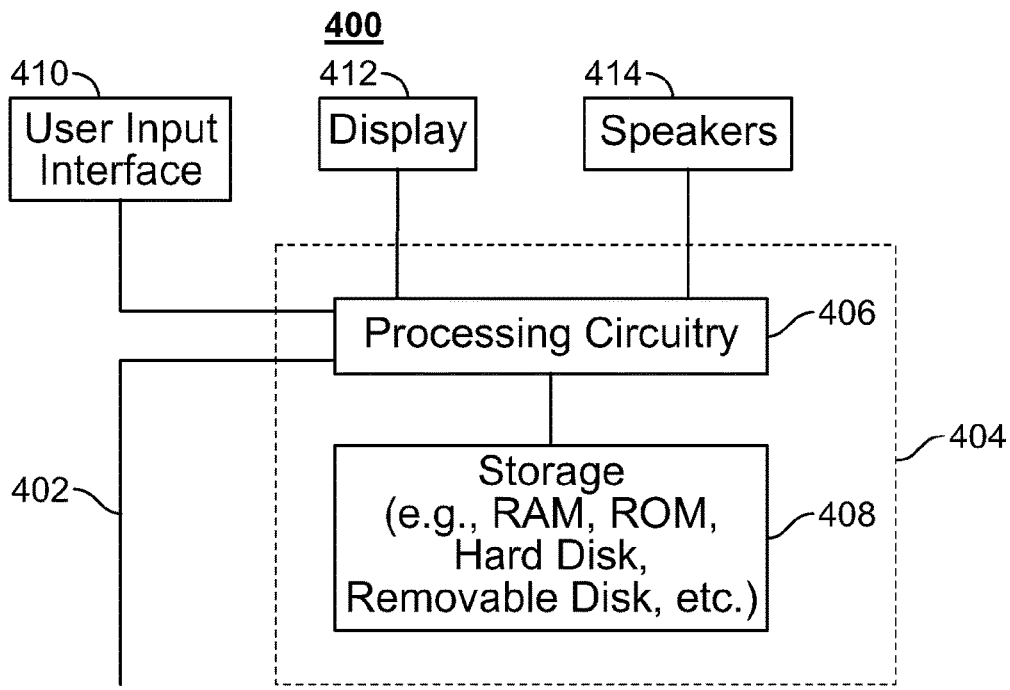
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
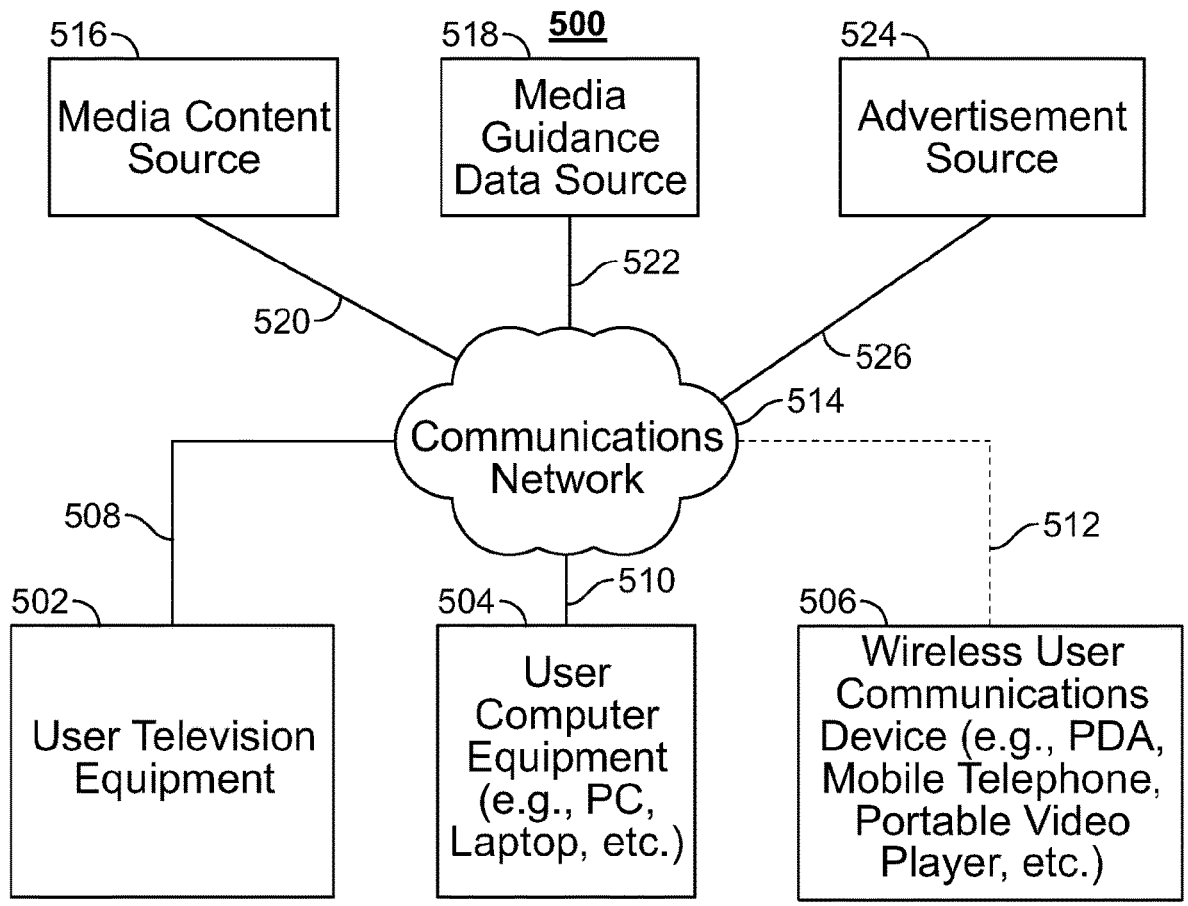
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video-sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-14 are provided below. It should be noted that processes 600-1400, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
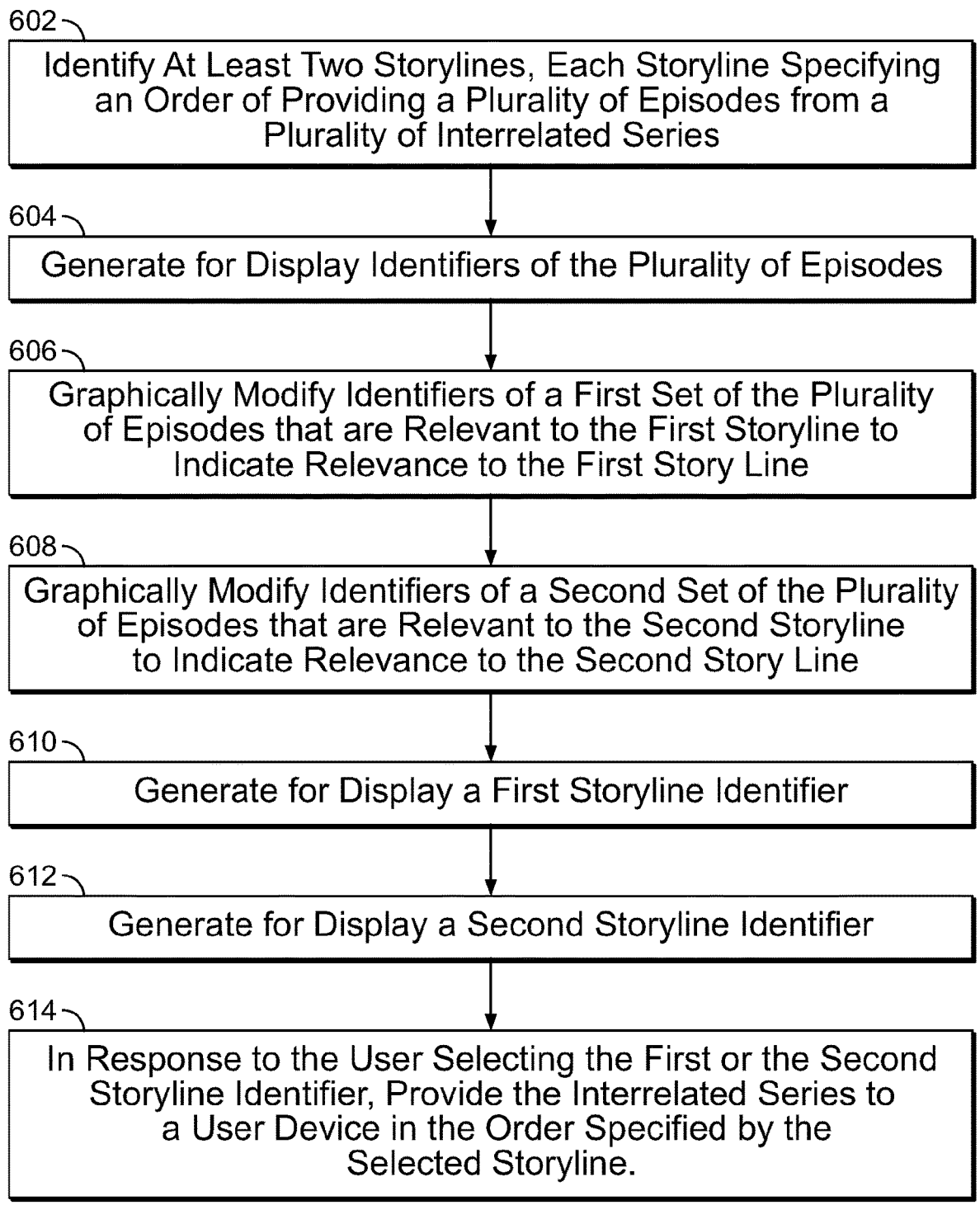
FIG. 6 depicts an illustrative flow diagram for a process of generating a storyline interface, in accordance with some embodiments of the disclosure.

FIG. 6 depicts an illustrative flow diagram of a process 600 for generating a storyline interface in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 identifies at least two storylines, each storyline specifying an order of providing a plurality of episodes from a plurality of interrelated series. In some embodiments, the plurality of interrelated series can include a first series, and at least one of a sequel series, prequel series, crossover series, or series that occur in the shared imaginary universe as the first series. In some embodiments, the interrelated series may be interrelated in any other way. In some embodiments, the plurality of interrelated series includes the first series, second series, third series, and fourth series described with respect to FIG. 1A. In some embodiments, the plurality of episodes may include Ser. 1, Eps. 1-5, Ser. 2; Eps. 1-2; Ser. 3, Eps. 1-3; and Ser. 4, Eps. 1-3 as depicted by FIG. 1A.

In some embodiments, control circuitry 404 may identify two storylines, (e.g., storyline 1 and storyline 2 of FIG. 1A). In some embodiments, each storyline may define a sequence of some episodes (or portions of episodes) from the plurality of episodes. In some embodiments, control circuitry 404 may receive the storylines from a remote serve (e.g., media guidance data sources 518). In some embodiments, control circuitry 404 may identify storylines by analyzing metadata of the episodes. For example, control circuitry 404 may identify a storyline relating to a certain character of the plurality of series, by determining that only some episodes include metadata identifying that character.

Process 600 continues at 604, where control circuitry 404 may generate for display identifiers of the plurality of episodes. For example, control circuitry 404 may generate identifiers for display on user television equipment 502 or user computer equipment 504. In some embodiments, control circuitry 404 may generate the identifiers of the plurality of episodes or display as depicted on display 100 of FIG. 1A. For example, control circuitry 404 may generate a geometric shape with a label to identify each episode. In some embodiments, the geometric shapes may be arranged by control circuitry 404 on a display in a sequential order. In some embodiments, the geometric shapes may be connected by arrows to demonstrate the original order of each series of the plurality of series.

Process 600 continues at 606, where control circuitry 404 may graphically modify identifiers of a first set of the plurality of episodes that are relevant to the first storyline to indicate relevance to the first storyline. For example, control circuitry 404 may determine that Ser. 1, Ep. 3; Ser. 1; Ep. 4, Ser. 1; Ep. 5, and Ser. 4; Ep. 1 (a first set of episodes) are relevant to the first storyline. In some embodiments, control circuitry 404 may then graphically modify identifiers of the first set of episodes to indicate their relevance to the first storyline. For example, these identifiers may be modified to include a first color (e.g., a color identified by label 104 of FIG. 1A)

Process 600 continues at 608, where control circuitry 404 may graphically modify identifiers of a second set of the plurality of episodes that are relevant to the second storyline to indicate relevance to the second storyline. For example, control circuitry 404 may determine that Ser. 2, Ep. 2; Ser. 1, Ep. 1, Ser. 1, Ep. 2; Ser. 4, Ep. 2; and Ser. 4, Ep. 3 (a second set of episodes) are relevant to the second storyline. In some embodiments, control circuitry 404 may then graphically modify identifiers of the second set of episodes to indicate their relevance to the second storyline. For example, these identifiers may be modified to include a second color (e.g., a color identified by label 106 of FIG. 1A). In some embodiments, the identifiers of second set of episodes may be modified as depicted in FIG. 1A.

Process 600 continues at 610, where control circuitry 404 may generate for display a first storyline identifier. For example, control circuitry 404 may generate for display the first storyline identifier on user television equipment 502, or user computer equipment 504, or display 100 of FIG. 1A. In some embodiments, control circuitry 404 may generate the first storyline identifier to include a button (or any other user interface element) with a text label (e.g., "Storyline 1" or a text relevant to the first storyline). In some embodiments, the first storyline identifier may be used by the user to select the first storyline for playback.

Process 600 continues at 612, where control circuitry 404 may generate for display a second storyline identifier. For example, control circuitry 404 may generate the second storyline identifier for display on user television equipment 502 or user computer equipment 504, or on display 100 of FIG. 1A. In some embodiments, control circuitry 404 may generate the second storyline identifier to include a button (or any other user interface element) with a text label (e.g., "Storyline 2" or a text relevant to the second storyline). In some embodiments, the first storyline identifier may be used by the user to select the second storyline for playback.

Process 600 continues at 612, where control circuitry 404 may, in response to the user selecting the first or the second storyline identifier, provide the interrelated series to a user device in the order specified by the selected storyline. For example, if the user selected the first storyline, control circuitry 404 may generate for playback the first set of episodes (e.g., Ser. 1, Ep. 3; Ser. 1, Ep. 41 Ser. 1, Ep. 5; and Ser. 4, Ep. 1) in the order defined by the first storyline. In some embodiments, control circuitry 404 may generate for display only portions of episodes defined by the first storyline. In some embodiments, control circuitry 404 may schedule a recording of the episodes (or portions of episodes) defined by the first storyline for later presentation to the user.

In some embodiments, if the user selected the second storyline, control circuitry 404 may generate for playback the second set of episodes (e.g., Ser. 2, Ep. 2; Ser. 1, Ep. 1; Ser. 1, Ep. 2; Ser. 4, Ep. 2; and Ser. 4, Ep. 3) in the order defined by the second storyline. In some embodiments, control circuitry 404 may generate for display only portions of episodes defined by the first storyline. In some embodiments, control circuitry 404 may schedule a recording of the episodes (or portions of episodes) defined by the second storyline for later presentation to the user.

Figure 7:
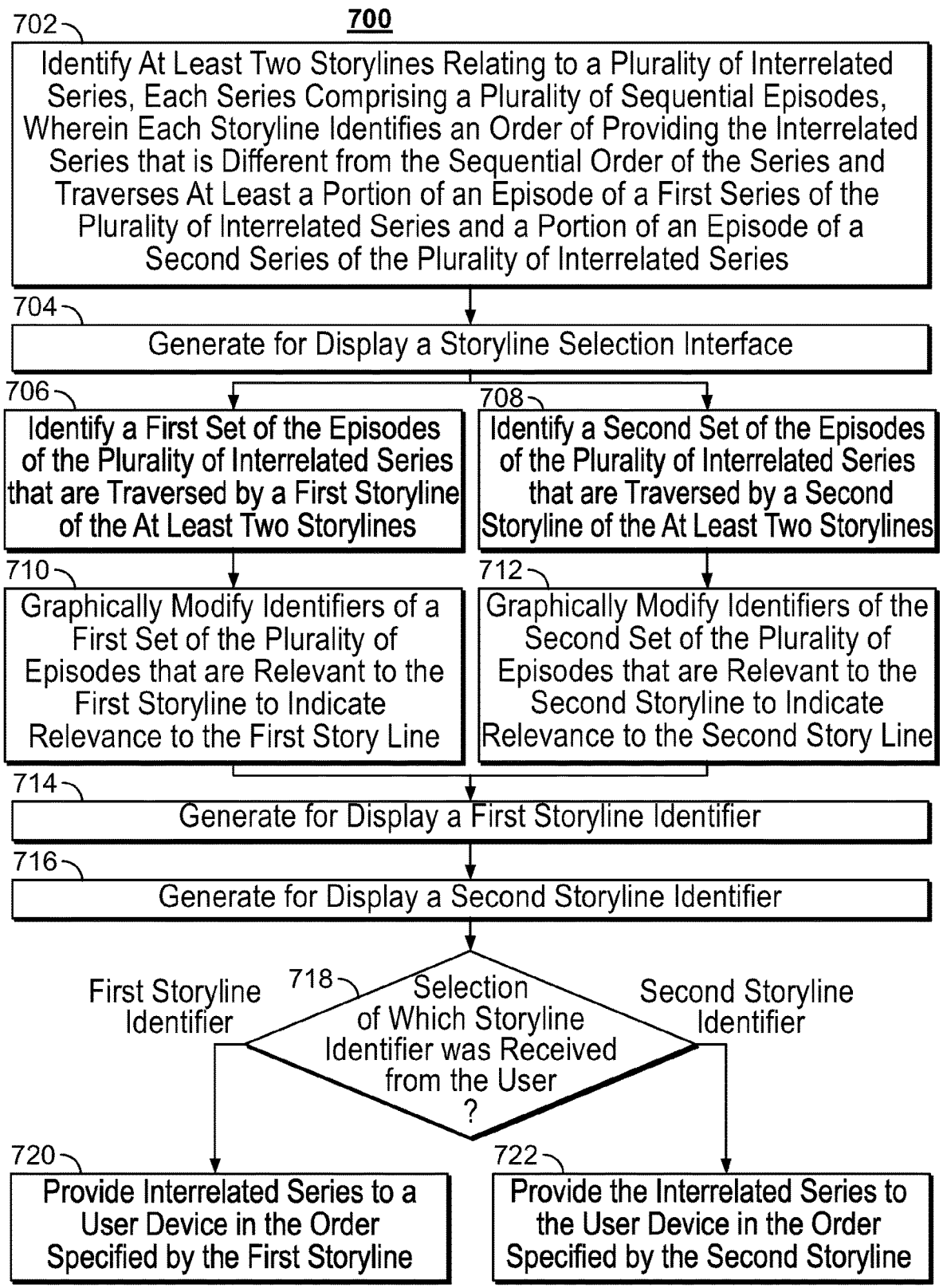
FIG. 7 depicts another illustrative flow diagram for a process of generating a storyline interface, in accordance with some embodiments of the disclosure.

FIG. 7 depicts another illustrative flow diagram of a process 700 for generating a storyline interface in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 identifies at least two storylines relating to a plurality of interrelated series, each series comprising a plurality of sequential episodes. In some embodiments, the plurality of interrelated series can include a first series, and at least one of a sequel series, prequel series, crossover series, or series that occurs in the shared imaginary universe as the first series. In some embodiments, the interrelated series may be interrelated in any other way. In some embodiments, the plurality of interrelated series includes the first series, second series, third series, and fourth series described with respect to FIG. 1A. In some embodiments, the plurality of episodes may include Ser. 1, Eps. 1-5; Ser. 2, Eps. 1-2; Ser. 3, Eps. 1-3; and Ser. 4, Eps. 1-3 as depicted by FIG. 1A.

In some embodiments, the plurality of interrelated series includes the series related to the "Arrowverse" plurality of series. For example, the plurality of interrelated series may include the "Arrow" TV series. The plurality of interrelated series may include the "Flash" TV series, which is a spin-off of the "Arrow" TV series. The plurality of interrelated series may include the "Legends of Tomorrow" TV series which take place in the same functional universe as the "Arrow" TV series. The plurality of interrelated series may further include the "Supergirl" TV series which includes multiple crossovers with the "Arrow" TV series and the "Flash" TV series.

In some embodiments, control circuitry 404 may identify two storylines, (e.g., storyline 1 and storyline 2 of FIG. 1A). In some embodiments, each storyline may define a sequence of some episodes (or portions of episodes) from the plurality of episodes. In some embodiments, control circuitry 404 may receive the storylines from a remote serve (e.g., media guidance data sources 518). In some embodiments, control circuitry 404 may identify storylines by analyzing metadata of the episodes. For example, control circuitry 404 may identify a storyline relating to a certain character of the plurality of series, by determining that only some episodes include metadata identifying that character.

In some embodiments, each storyline may identify an order of providing the interrelated series that is different from the sequential order of the series and traverses at least a portion of an episode of a first series of the plurality of interrelated series and a portion of an episode of a second series of the plurality of interrelated series. In some embodiments, the first storyline may be a storyline of a particular character (e.g., Kara Zor-E1 from the "Arrowverse" plurality of series). In this example, the first storyline may include all episodes (or portions of episodes) that feature this particular character.

For example, the first storyline may include some episodes (or portions of episodes) of the "Arrow" TV series and the "Flash" TV series that feature the Kara Zor-E1 character, as well as all episodes of the "Supergirl" TV series (as they all feature the Kara Zor-E1 character). In some embodiments, the first storyline may define the order of presentation of the relevant episodes that is different from the order in which the episodes were original aired. For example, the first storyline may chronologically present the storyline of the Kara Zor-El character, even if the portions of the storyline relevant to Kara Zor-El were originally presented out of chronological order.

In some embodiments, the second storyline may be a storyline relevant to a certain event. For example, the second storyline may be a storyline of major characters struggling against a shared antagonist. In this example, the second storyline may include all episodes (or portions of episodes) that are relevant to the particular event across the plurality of series. In some embodiments, the second storyline may define the order of presentation of the relevant episodes that is different from the order in which the episodes were original aired. For example, the second storyline may chronologically present the storyline a certain event (e.g., its origins and its aftermath), even if that storyline was original presented out of chronological order.

Process 700 continues at 704, where control circuitry 404 may generate for display a storyline selection interface. In some embodiments, control circuitry 404 may generate the storyline selection interface on user television equipment 502 or user computer equipment 504. In some embodiments, control circuitry 404 may generate the storyline selection interface on one of displays 100, 120, 140 as depicted in FIGS. 1A, 1B, and 1C.

In some embodiments, control circuitry 404 may generate for display an identifier for each of the episodes of each of the plurality of interrelated series. For example, control circuitry 404 may generate identifiers for display on user television equipment 502 or user computer equipment 504. In some embodiments, control circuitry 404 may generate the identifiers of the plurality of episodes for display as depicted on display 100 of FIG. 1A, display 120 of FIG. 1B, or display 140 of FIG. 1C. For example, control circuitry 404 may generate a geometric shape with a label to identify each episode. In some embodiments, the geometric shapes may be arranged by control circuitry 404 on a display in a sequential order (e.g., the order of the original broadcast). In some embodiments, the geometric shapes may be connected by arrows to demonstrate the original order of each series of the plurality of series.

In some embodiments, control circuitry 404 may further generate for display a storyline selection interface by performing all or some of steps 706-716. Steps 706-716 may be performed simultaneously, optionally, or sequentially.

At 706, control circuitry 404 may identify a first set of the episodes of the plurality of interrelated series that are traversed by a first storyline of the at least two storylines. In some embodiments, the first storyline may be a data-structure that is received from a remote server (e.g., media guidance data source 518). The data-structure may explicitly define which episodes of the plurality of series are traversed by a first storyline of the at least two storylines. For example, the data-structure may be a table, as depicted below:

TABLE 1

| Order Number | Episode | Portion of the episodes |
|---|---|---|
| 1 | Ser. 1, Ep. 3 | Entire Episode |
| 2 | Ser. 1, Ep. 4 | Entire Episode |
| 3 | Ser. 1, Ep. 5 | Entire Episode |
| 4 | Ser. 4, Ep. 1 | 0:25-0:50 |

In this example, Table 1 defines which episodes are traversed by the first storyline, the order of traversal, and which portion of the episode is relevant. In some embodiments, control circuitry 404 may use the data-structure (e.g., as depicted Table 1) to identify a first set of the episodes of the plurality of interrelated series that are traversed by a first storyline (e.g., the first set may include Ser. 1, Ep. 3; Ser. 1, Ep. 4; Ser. 1, Ep. 5; and Ser. 4, Ep. 1).

In some embodiments, control circuitry 404 may identify a first set of the episodes of the plurality of interrelated series by comparing metadata of the first storyline to the metadata of episodes. For example, if the metadata of the first storyline includes a character name, control circuitry 404 may include in the first set of the episodes all episodes of the plurality of series that have metadata identifying that character.

At step 710, control circuitry 404 may graphically modify identifiers of the first set of the plurality of episodes to indicate relevance to the first storyline. For example, if the first set includes Ser. 1, Ep. 3; Ser. 1, Ep. 4; Ser. 1, Ep. 5; and Ser. 4, Ep. 1, then identifiers of those episodes may be modified to be indicative of the first storyline. For example, control circuitry 404 may modify the color of the identifiers. For example, the background of the identifiers may be modified to include a first color (e.g., a color indicted by label 104 of FIG. 1A).

At 708, control circuitry 404 may identify a second set of the episodes of the plurality of interrelated series that are traversed by a second storyline of the at least two storylines. In some embodiments, the second storyline may be a data-structure that is received from a remote server (e.g., media guidance data source 518). The data-structure may explicitly define which episodes of the plurality of series are traversed by the second storyline of the at least two storylines. For example, the data-structure, may be a table, as depicted below:

TABLE 2

| Order Number | Episode | Portion of the episodes |
|---|---|---|
| 1 | Ser. 2, Ep. 2 | Entire Episode |
| 2 | Ser. 1, Ep. 1 | 0:30-0:45 |
| 3 | Ser. 1, Ep. 2 | Entire Episode |
| 4 | Ser. 4, Ep. 2 | Entire Episode |
| 5 | Ser. 4, Ep. 3 | Entire Episode |

In this example, Table 2 defines which episodes are traversed by the second storyline, the order of traversal, and which portion of the episode is relevant. In some embodiments, control circuitry 404 may use the data-structure (e.g., as depicted Table 1) to identify a second set of the episodes of the plurality of interrelated series that are traversed by a second storyline (e.g., the second set may include Ser. 2, Ep. 2; Ser. 1, Ep. 1; Ser. 1, Ep. 2; Ser. 4, Ep. 2; and Ser. 4, Ep. 3).

In some embodiments, control circuitry 404 may identify a second set of the episodes of the plurality of interrelated series by comparing metadata of the second storyline to the metadata of the episodes. For example, if the metadata of the second storyline includes a character name, control circuitry 404 may include in the second set of the episodes all episodes of the plurality of series that have metadata identifying that character.

At step 716, control circuitry 404 may graphically modify identifiers of the second set of the plurality of episodes to indicate relevance to the second storyline. For example, if the second set includes Ser. 2, Ep. 2; Ser. 1, Ep. 1; Ser. 1, Ep. 2; Ser. 4, Ep. 2; and Ser. 4, Ep. 3, then identifiers of those episodes may be modified to be indicative of the second storyline. For example, control circuitry 404 may modify the color of the identifiers. For example, the background of the identifiers may be modified to include a second color (e.g., a color indicted by label 104 of FIG. 1A). In some embodiments, the identifiers of the second set of episodes may be modified as depicted by FIG. 1A, 1B or 1C.

At step 714, control circuitry 404 may generate for display a first storyline identifier (e.g., first storyline identifier 108 of FIG. 1A). For example, control circuitry 404 may generate a first storyline identifier for display on user television equipment 502 or user computer equipment 504, or one of displays 100, 120, 140 of FIGS. 1A, 1B, and 1C. In some embodiments, control circuitry 404 may generate the first storyline identifier to include a button (or any other user interface element) with a text label (e.g., "Storyline 1" or a text relevant to the first storyline). In some embodiments, the first storyline identifier may be used by the user to select the first storyline for playback.

At step 716, control circuitry 404 may generate for display a second storyline identifier (e.g., second storyline identifier 110 of FIG. 1A). For example, control circuitry 404 may generate a second storyline identifier for display on user television equipment 502 or user computer equipment 504, or one of displays 100, 120, 140 of FIGS. 1A, 1B, and 1C. In some embodiments, control circuitry 404 may generate the second storyline identifier to include a button (or any other user interface element) with a text label (e.g., "Storyline 1" or a text relevant to the second storyline). In some embodiments, the second storyline identifier may be used by the user to select the second storyline for playback.

Process 700 continues at step 718, where control circuitry 404 may take a different action based on receiving a different selection from the user (e.g., via user input interface 410). In some embodiments, if the control circuitry 404 receives a selection of the first storyline identifier from the user, process 700 continues at step 720. In some embodiments, if the control circuitry 404 receives a selection of the second storyline identifier from the user, process 700 continues at step 722.

At 720, control circuitry 404 may provide interrelated series to a user device in the order specified by the first storyline. For example, control circuitry 404 may generate for display episodes (or portions of episodes) of the first set of episodes (e.g., as identified by Table 1), in the order specified by the first storyline (e.g., as specified by Table 1). In some embodiments, control circuitry 404 may schedule a recording of the episodes (or portions of episodes) defined by the first storyline for later presentation to the user.

At 722, control circuitry 404 may provide interrelated series to a user device in the order specified by the second storyline. For example, control circuitry 404 may generate for display episodes (or portions of episodes) of the second set of episodes (e.g., as identified by Table 2), in the order specified by the second storyline (e.g., as specified by Table 2). In some embodiments, control circuitry 404 may schedule a recording of the episodes (or portions of episodes) defined by the second storyline for later presentation to the user.

Figure 8:
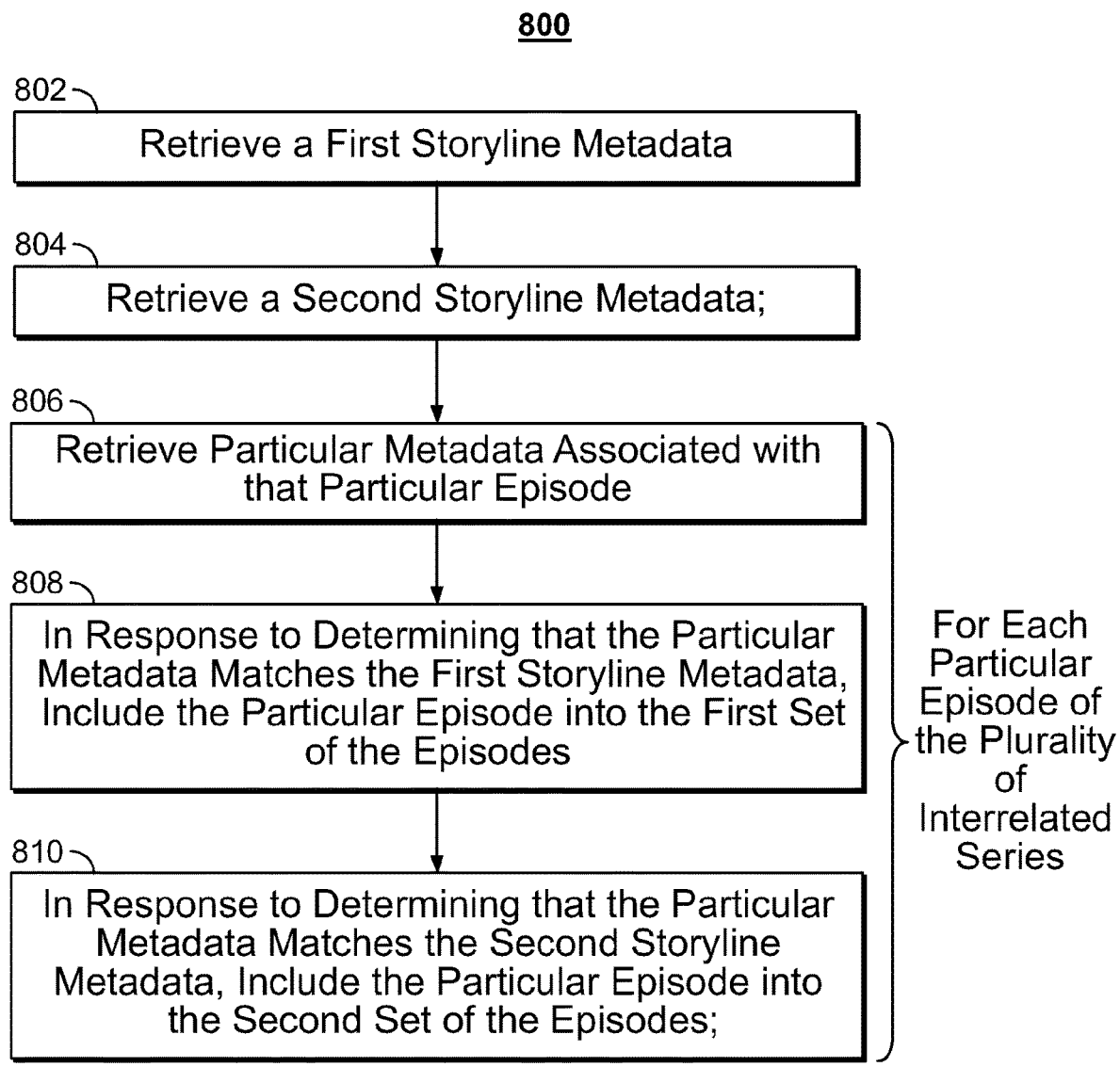
FIG. 8 depicts an illustrative flow diagram for a process of creating sets of episodes, in accordance with some embodiments of the disclosure.

FIG. 8 depicts an illustrative flow diagram of a process 800 for creating sets of episodes, in accordance with some embodiments of the disclosure. Process 800 may be executed by control circuitry 404, for example, in a manner instructed to control circuitry 404 by the media guidance application. In some embodiments, process 800 is executed as a part of block 706 or 708.

Process 800 begins at 802, wherein control circuitry 404 retrieves a first storyline metadata. In some embodiments, first storyline metadata may be retrieved from local storage (e.g., storage 408) or remote server (e.g., media guidance data source 518). In some embodiments, the storyline metadata may be inputted by the user. For example, the user may be asked to input search string relating to a storyline the user wants to experience. In some embodiments, the first storyline metadata may comprise at least one of character metadata, title metadata, or chronology metadata. For example, first storyline metadata may be defined by a name of a character (e.g., "Kara Zor-El"), a title of an event (e.g., "attack of Music Meister"), or chronology data (e.g., all in-universe events between 2008-2012).

Process 800 continues at 804, wherein control circuitry 404 retrieves a second storyline metadata. In some embodiments, steps 802 and 804 may be performed simultaneously, sequentially or optionally. In some embodiments, the second storyline metadata may be retrieved from local storage (e.g., storage 408) or remote server (e.g., media guidance data source 518). In some embodiments, the second storyline metadata may be inputted by the user. For example, the user may be asked to inputs search string relating to a storyline the user wants to experience. In some embodiments, the second storyline metadata may comprise at least one of character metadata, title metadata, or chronology metadata. For example, first storyline metadata may define a name of a character (e.g., "Kara Zor-El"), a title of an event (e.g., "attack of Music Meister"), or chronology data (e.g., all in-universe events between 2008-2012).

Process 800 continues to steps 806-810. In some embodiments, steps 806-810 may be repeated for each particular episode of the plurality of episodes of the interrelated series.

At 806, control circuitry 404 may retrieve particular metadata associated with a particular episode. For example, the particular metadata may be retrieved from local storage (e.g., storage 408) or remote server (e.g., media guidance data source 518).

At 808, control circuitry 404 may, in response to determining that the particular metadata matches the first storyline metadata, include the particular episode in the first set of the episodes. For example, if the first storyline metadata includes a character name (e.g., "Kara Zor-El"), control circuitry 404 may check if the particular metadata also includes a reference to that character name. If so, control circuitry 404 may include the particular episode in the first set of the episodes (e.g. as part of step 706).

At 810, control circuitry 404 may, in response to determining that the particular metadata matches the second storyline metadata, include the particular episode into the second set of the episodes. For example, if the second storyline metadata includes a chronology data (e.g., year 2010), control circuitry 404 may check if the particular metadata also includes a reference to that chronology data. If so, control circuitry 404 may include the particular episode into the second set of the episodes (e.g., as part of step 708).

FIG. 9 depicts an illustrative flow diagram of a process 900 for generating episode identifiers, in accordance with some embodiments of the disclosure. Process 900 may be executed by control circuitry 404, for example, in a manner instructed to control circuitry 404 by the media guidance application. In some embodiments, process 900 is executed as a part of block 704.

Process 900 begins at 902, wherein control circuitry 404 generates for display an identifier for each of the episodes of each of the plurality of interrelated series. For example, control circuitry 404 may generate the identifiers for display on display 412, display 100, display 120, or display 140. In some embodiments, control circuitry 404 may generate the identifiers in response to a request by the user. In some embodiments, control circuitry 404 may generate the identifiers at a pre-defined point in the series. For example, when the series begins, control circuitry 404 may present an option to the user to either watch the series as originally aired or in accordance with one of the storylines. In some embodiments, control circuitry 404 may generate for display an identifier for each of the episodes of each of the plurality of interrelated series by performing steps 904 and 906.

At step 904, control circuitry 404 may generate for display a geometric shape for each of the episodes of each of the plurality of interrelated series. For example, a rectangle (or another shape) may be generated for each of the episodes. For example, geometric shapes may be generated as shown in FIG. 1A.

At step 964, control circuitry 404 may generate for display visual connectors that connect the geometric shapes based on the sequential order of the series. For example, arrows may be generated by control circuitry 404 to connect the rectangles (or other shapes) in accordance to the order in which the episodes were original aired.

Figure 10:
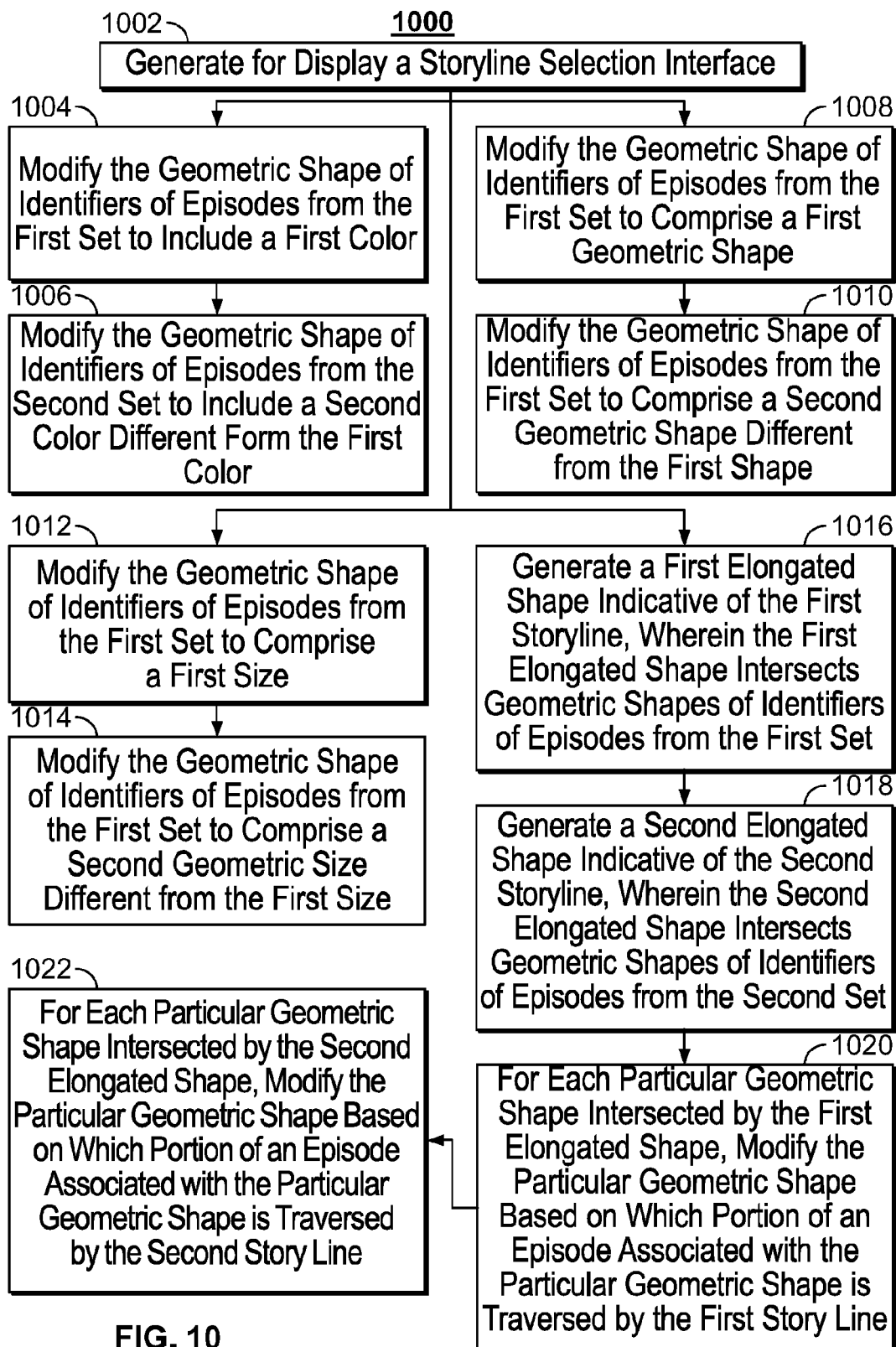
FIG. 10 depicts yet another illustrative flow diagram for a process of generating a storyline interface, in accordance with some embodiments of the disclosure.

FIG. 10 depicts yet another illustrative flow diagram of a process 1000 for a process of generating a storyline interface, in accordance with some embodiments of the disclosure. Process 1000 may be executed by control circuitry 404, for example, in a manner instructed to control circuitry 404 by the media guidance application. In some embodiments, process 1000 is executed as a part of block 704.

Process 1000 begins at 1002, wherein control circuitry 404 generates for display a storyline selection interface. In some embodiments, the storyline selection interface may be generated as described in step 704 of FIG. 7. In some embodiments, the storyline selection interface may be further modified as by control circuitry 404 performing one or several of series of steps, such as steps 1002-1006, steps 1008-1010, steps 1012-1014, or steps 1016-1022. In some embodiments, these series of steps may be performed optionally, simultaneously, or consecutively.

At 1004, control circuitry 404 may modify the geometric shape of identifiers of episodes from the first set (e.g., as defined at step 706) to include a first color (e.g., red). For example, geometric shape identifiers of episodes from the first set may be modified to include a red background, a red border, or a red outline.

At 1006, control circuitry 404 may modify the geometric shape of identifiers of episodes from the second set (e.g., as defined at step 708) to include a second color (e.g., blue) that is different from the first color. For example, geometric shape identifiers of episodes from the first set may be modified to include a blue background (e.g., as depicted in FIG. 1A), a blue border, or a blue outline.

At 1008, control circuitry 404 may modify the geometric shape of identifiers of episodes from the first set (e.g., as defined at step 706) to comprise a first geometric shape. For example, geometric shape identifiers of episodes from the first set may be modified to take on a rounded shape.

At 1010, control circuitry 404 may modify the geometric shape of identifiers of episodes from the second set (e.g., as defined at step 708) to comprise a second geometric shape different from the first shape. For example, geometric shape identifiers of episodes from the second set may be modified to take on a hexagonal shape (e.g., as depicted in FIG. 1B).

At 1012, control circuitry 404 may modify the geometric shape of identifiers of episodes from the first set (e.g., as defined at step 706) to comprise a first size. For example, geometric shape identifiers of episodes from the first set may be increased by 50% (or any other scale).

At 1014, control circuitry 404 may modify the geometric shape of identifiers of episodes from the second set (e.g., as defined at step 708) to comprise a second size, different from the first size. For example, geometric shape identifiers of episodes from the first set may be increased by 20% (or any other scale different from the scale in step 1012).

At 1016, control circuitry 404 may generate a first elongated shape indicative of the first storyline, wherein the first elongated shape intersects geometric shapes of identifiers of episodes from the first set (e.g., as defined at step 706). For example, control circuitry 404 may generate a first arrow that may intersect only identifiers of episodes from the first set, but not any other identifiers. In some embodiments, the first arrow may comprise a first color, style, or label indicative of the first storyline.

At 1018, control circuitry 404 may generate a second elongated shape indicative of the second storyline, wherein the second elongated shape intersects geometric shapes of identifiers of episodes from the second set (e.g., as defined at step 708). For example, control circuitry 404 may generate a second arrow (e.g., arrow 144 of FIG. 1C) that may intersect only identifiers of episodes from the first set, but not any other identifiers. In some embodiments, the second arrow may comprise a second color, style, or label indicative of the second storyline.

At 1020 (which is performed optionally), control circuitry 404 may for each particular geometric shape intersected by the first elongated shape (e.g., a first arrow), modify the particular geometric shape based on which portion of an episode associated with the particular geometric shape is traversed by the first storyline. For example, if the first storyline traverses the entirety of an episode, the identifier of that episode may be fully traversed by the first arrow. In another example, if the first storyline traverses a portion (e.g., the last 25% of an episode), the identifier of that episode may be partially traversed by the first arrow (e.g., the first arrow may intersect the last 25% of the identifier).

At 1020 (which is performed optionally), control circuitry 404 may for each particular geometric shape intersected by the second elongated shape (e.g., the second arrow), modify the particular geometric shape based on which portion of an episode associated with the particular geometric shape is traversed by the second storyline. For example, if the second storyline traverses the entirety of an episode, the identifier of that episode may be fully traversed by the second arrow. In another example, if the second storyline traverses a portion (e.g., the first 25% of an episode), the identifier of that episode may be partially traversed by the second arrow (e.g., the second arrow may intersect the first 25% of the identifier).

It is contemplated that the steps or descriptions of each of FIGS. 6-10 may be used with any other embodiment of this disclosure. It is contemplated that some steps or descriptions of each of FIGS. 6-10 may be optional and may be omitted in some embodiments. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-10 are intended to be illustrative and not limiting. One skilled in the art would appreciate that the steps of the processes in FIGS. 6-10 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing a narrative based media content, the method comprising:
   identifying at least two narratives relating to a plurality of interrelated series, each series comprising a plurality of sequential episodes, wherein each narrative identifies an order of providing the interrelated series that is different from the sequential order of the series and traverses at least a portion of an episode of a first series of the plurality of interrelated series and a portion of an episode of a second series of the plurality of interrelated series;
   generating for display a narrative selection interface by:
      generating for display an identifier for each of the episodes of each of the plurality of interrelated series by:
         generating for display a geometric shape for each of the episodes of each of the plurality of interrelated series; and
         generating for display visual connectors that connect the geometric shapes based on the sequential order of the series;
      identifying a first set of the episodes of the plurality of interrelated series that are traversed by a first narrative of the at least two narratives;
      graphically modifying identifiers of the first set of the plurality of episodes to indicate relevance to the first narrative;
      identifying a second set of the episodes of the plurality of interrelated series that are traversed by a second narrative of the at least two narrative;
      graphically modifying identifiers of the second set of the plurality of episodes that are relevant to the second narrative to indicate relevance to the second narrative;
      generating for display a first narrative identifier;
      generating for display a second narrative identifier;
      generating a first elongated shape indicative of the first narrative, wherein the first elongated shape intersects geometric shapes of identifiers of episodes from the first set and
      generating a second elongated shape indicative of the second narrative, wherein the second elongated shape intersects geometric shapes of identifiers of episodes from the second set;
   in response to receiving a selection of the first narrative identifier from the user, providing interrelated series to a user device in the order specified by the first narrative; and
   in response to receiving a selection of the second narrative identifier from the user, providing the interrelated series to the user device in the order specified by the second narrative.

2. The method of claim 1, further comprising:
   generating for display an identifier of a movie that is traversed by the first narrative; and
   graphically modifying the identifier of the movie to indicate relevance to the first narrative.

3. The method of claim 1, further compromising:
   retrieving a first narrative metadata;
   retrieving a second narrative metadata;
   for each particular episode of the plurality of interrelated series:
      retrieving particular metadata associated with that particular episode; and
      in response to determining that the particular metadata matches the first narrative metadata, including the particular episode into the first set of the episodes;
      in response to determining that the particular metadata matches the second narrative metadata, including the particular episode into the second set of the episodes.

4. The method of claim 3, wherein:
   the first narrative metadata comprises at least one of character metadata, title metadata, or chronology metadata; and
   the second narrative metadata comprises at least one of character metadata, title metadata, or chronology metadata.

5. The method of claim 1, wherein generating for display a narrative selection interface further comprises:
   modifying the geometric shape of identifiers of episodes from the first set to include a first color; and
   modifying the geometric shape of identifiers of episodes from the second set to include a second color different from the first color.

6. The method of claim 1, wherein generating for display a narrative selection interface further comprises:
   modifying the geometric shape of identifiers of episodes from the first set to comprise a first geometric shape; and
   modifying the geometric shape of identifiers of episodes from the first set to comprise a second geometric shape different from the first shape.

7. The method of claim 1, wherein generating for display a narrative selection interface further comprises:
   modifying the geometric shape of identifiers of episodes from the first set to comprise a first size; and
   modifying the geometric shape of identifiers of episodes from the first set to comprise a second geometric size different from the first size.

8. The method of claim 1, wherein:
   for each particular geometric shape intersected by the first elongated shape, modifying the particular geometric shape based on which portion of an episode associated with the particular geometric shape is traversed by the first narrative; and
   for each particular geometric shape intersected by the second elongated shape, modifying the particular geometric shape based on which portion of an episode associated with the particular geometric shape is traversed by the second narrative.

9. A system for providing a narrative based media content, the system comprising:
   control circuitry configured to:
      identify at least two narratives relating to a plurality of interrelated series, each series comprising a plurality of sequential episodes, wherein each narrative identifies an order of providing the interrelated series that is different from the sequential order of the series and traverses at least a portion of an episode of a first series of the plurality of interrelated series and a portion of an episode of a second series of the plurality of interrelated series;

generate for display a narrative selection interface by:
  generating for display an identifier for each of the episodes of each of the plurality of interrelated series by:
    generating for display a geometric shape for each of the episodes of each of the plurality of interrelated series; and
    generating for display visual connectors that connect the geometric shapes based on the sequential order of the series;
  identifying a first set of the episodes of the plurality of interrelated series that are traversed by a first narrative of the at least two narratives;
  graphically modifying identifiers of the first set of the plurality of episodes to indicate relevance to the first narrative;
  identifying a second set of the episodes of the plurality of interrelated series that are traversed by a second narrative of the at least two narratives;
  graphically modifying identifiers of the second set of the plurality of episodes that are relevant to the second narrative to indicate relevance to the second narrative;
  generating for display a first narrative identifier;
  generating for display a second narrative identifier;
  generating a first elongated shape indicative of the first narrative, wherein the first elongated shape intersects geometric shapes of identifiers of episodes from the first set; and
  generating a second elongated shape indicative of the second narrative, wherein the second elongated shape intersects geometric shapes of identifiers of episodes from the second set;
  in response to receiving a selection of the first narrative identifier from the user, provide interrelated series to a user device in the order specified by the first narrative; and
  in response to receiving a selection of the second narrative identifier from the user, provide the interrelated series to the user device in the order specified by the second narrative.

10. The system of claim 9, wherein the control circuitry is configured to:
generate for display an identifier of a movie that is traversed by the first narrative; and
graphically modify the identifier of the movie to indicate relevance to the first narrative.

11. The system of claim 9, wherein the control circuitry is configured to:
retrieve a first narrative metadata;
retrieve a second narrative metadata;
for each particular episode of the plurality of interrelated series:
  retrieve particular metadata associated with that particular episode; and
  in response to determining that the particular metadata matches the first narrative metadata, include the particular episode into the first set of the episodes;
  in response to determining that the particular metadata matches the second narrative metadata, include the particular episode into the second set of the episodes.

12. The system of claim 11, wherein:
the first narrative metadata comprises at least one of character metadata, title metadata, or chronology metadata; and
the second narrative metadata comprises at least one of character metadata, title metadata, or chronology metadata.

13. The system of claim 9, wherein the control circuitry is configured to generate for display a narrative selection interface further by:
modifying the geometric shape of identifiers of episodes from the first set to include a first color; and
modifying the geometric shape of identifiers of episodes from the second set to include a second color different from the first color.

14. The system of claim 9, wherein the control circuitry is configured to generate for display a narrative selection interface further by:
modifying the geometric shape of identifiers of episodes from the first set to comprise a first geometric shape; and
modifying the geometric shape of identifiers of episodes from the first set to comprise a second geometric shape different from the first shape.

15. The system of claim 9, wherein the control circuitry is configured to generate for display a narrative selection interface further by:
modifying the geometric shape of identifiers of episodes from the first set to comprise a first size; and
modifying the geometric shape of identifiers of episodes from the first set to comprise a second geometric size different from the first size.

16. The system of claim 9, wherein the control circuitry is further configured to:
for each particular geometric shape intersected by the first elongated shape, modify the particular geometric shape based on which portion of an episode associated with the particular geometric shape is traversed by the first narrative; and
for each particular geometric shape intersected by the second elongated shape, modify the particular geometric shape based on which portion of an episode associated with the particular geometric shape is traversed by the second narrative.

* * * * *